United States Patent

Szodfridt

[15] 3,688,596
[45] Sept. 5, 1972

[54] SHIFTING MECHANISM FOR MULTI-SPEED TRANSMISSION

[72] Inventor: Imre Szodfridt, Solitudestrasse 8/1, Ditzingen, Germany

[22] Filed: June 17, 1969

[21] Appl. No.: 834,058

[52] U.S. Cl. ................... 74/337.5, 74/330, 192/3.57
[51] Int. Cl. .......................... F16h 5/28, F16d 67/00
[58] Field of Search ..... 74/337.5; 192/3.5, 3.57, 3.62

[56] References Cited

UNITED STATES PATENTS

| | | | |
|---|---|---|---|
| 1,693,645 | 12/1928 | Fahrney | 74/337.5 X |
| 1,701,395 | 2/1929 | Short | 192/3.5 X |
| 2,352,212 | 6/1944 | Lang et al. | 192/3.5 X |
| 2,427,652 | 9/1947 | Banker | 192/3.5 X |
| 2,956,444 | 10/1960 | Bensinger et al. | 74/337.5 X |
| 2,966,972 | 1/1961 | Nallinger | 74/337.5 X |
| 3,089,571 | 5/1963 | Schick | 74/337.5 X |

FOREIGN PATENTS OR APPLICATIONS 952,054  11/1956  Germany ................... 192/3.5

*Primary Examiner*—Carlton R. Croyle
*Assistant Examiner*—Thomas C. Perry
*Attorney*—Craig, Antonelli, Stewart & Hill

[57] ABSTRACT

Apparatus for shifting gears of a multi-speed transmission, including a disk-shaped shift plate having shifting gates or slots provided therein for directly controlling the selective engagement of the individual gears.

10 Claims, 4 Drawing Figures

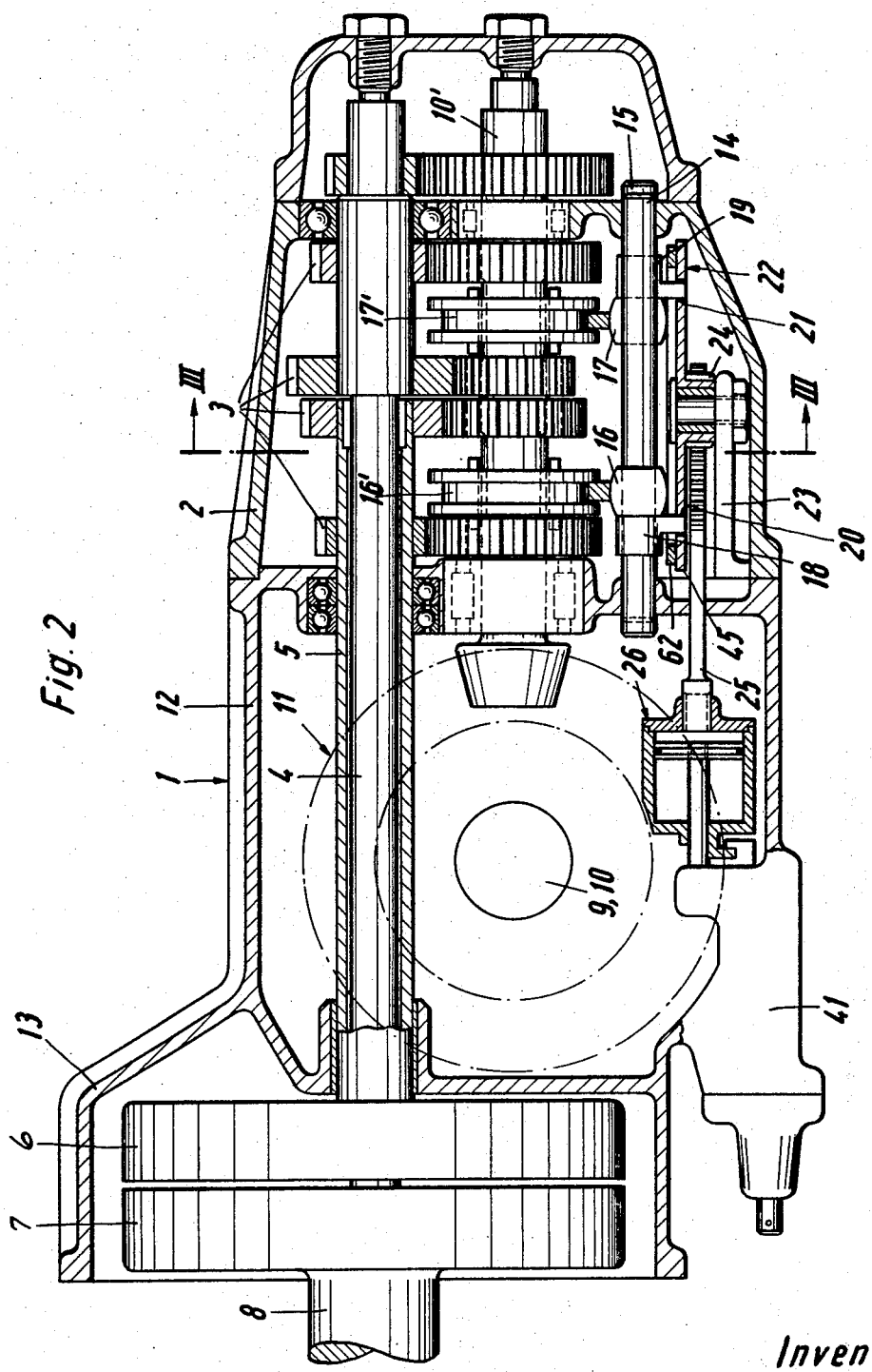

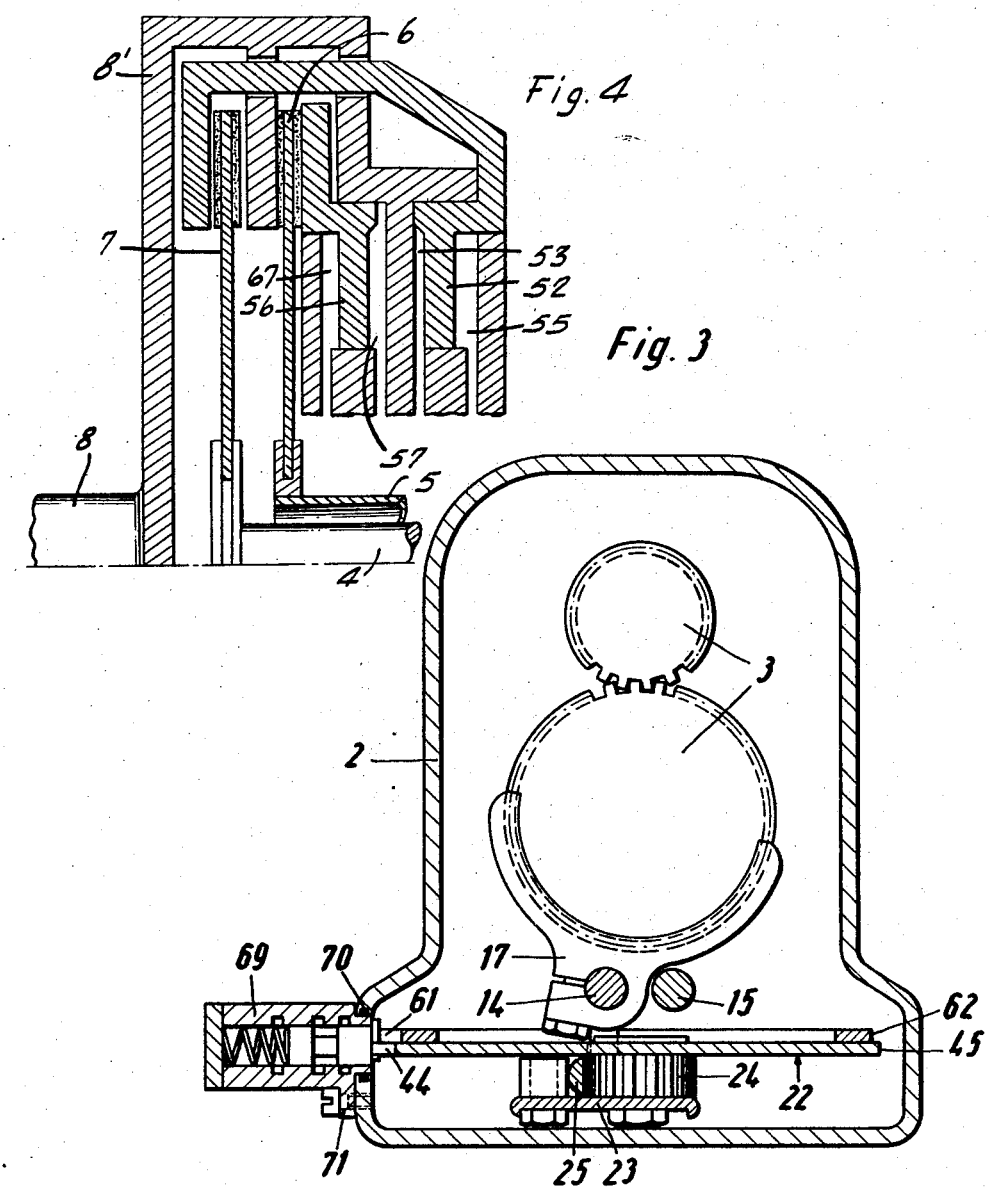

SHIFTING MECHANISM FOR MULTI-SPEED TRANSMISSION

BACKGROUND OF THE INVENTION

In the construction of vehicle transmissions, it is conventional to provide a disk-shaped shift plate, the rotation of which effects a forced displacement of individual shift forks associated with respective individual gears. With an arrangement of this type, the shift plate is retained in engagement with the individual gears by means of a locking action which can be selectively released by actuation of a clutch pedal. The shift plate thus serves only for shifting between the individual gears of the transmission and the vehicle clutch must be separately actuated.

In order to simplify the operation, it has been suggested to provide, within the shifting mechanism of a vehicle transmission, a camshaft controlled by the rotational speed of the driving engine of the vehicle. A camshaft of this type serves as a control member for a plurality of hydraulic actuating members, which members, in turn, effect a rotation or displacement of the shift rods carrying the shift forks of the transmission, and also effect actuation of the vehicle clutch. However, these conventional arrangements exhibit well-known disadvantages, insofar as the plurality of hydraulic actuating members required for actuating the vehicle clutch and shifting the gears of the transmission render the mechanism exceedingly complex and correspondingly expensive to produce and maintain. Moreover, the sensitivity of the control of the hydraulic actuating members is severely limited in view of the practical limitations of the magnitude of the outer diameter of the camshaft.

Accordingly, it is an objective of the present invention to provide a shifting mechanism which avoids the disadvantages inherent in the conventional devices, while nevertheless insuring an efficient though sensitive operation.

Further, it is an objective of the present invention to provide a shifting mechanism which is characterized by relative structural simplicity and correspondingly low manufacturing costs, although providing a reliable device for effecting shifting between individual gears of the transmission and actuation of the clutch interconnecting the transmission with the vehicle driving engine.

Finally, it is an objective of the present invention to provide a shifting mechanism for a vehicle transmission which affords a reliable means for actuating the vehicle clutch as well as the selective engagement of the individual gears of the transmission, which represents a significant improvement over the conventional devices for accomplishing a similar function with respect to the simplicity of construction, the effectiveness of operation and the adaptability to greater numbers of gear sets.

SUMMARY OF THE INVENTION

The aforementioned objectives are accomplished, in accordance with the present invention, by providing the disk-shaped shift plate, preferably in the region of the outer circumferential surface thereof, with profiled control surfaces functioning to control a clutch valve for the selective engagement of one or more clutches and for controlling a shifting phase valve governing the speed of rotation of the shift plate. As a result of this particularly advantageous construction of the shift plate, a compact and structurally simple shifting mechanism is provided which ensures a precise shifting between an unlimited number of gears and eliminates the necessity for a plurality of costly hydraulic intermediate members. Since the profiled control surfaces are preferably disposed in the region of the outer circumferential surface of the shift plate, a differentiated configuration of the profiled control surfaces is possible, thereby affording an extremely sensitive control of the shifting processes and the selective actuation of the vehicle clutch.

The safety of the operation of the shift plate contemplated by the present invention and the ease of assembling the valves cooperating therewith, are significantly enhanced by disposing the shift plate within the transmission case and by combining the clutch valves and/or shifting phase valves into a structural unit inserted in an opening of the transmission case and extending upwardly therefrom.

The motion of the shift plate, in accordance with the present invention, is effected by a servomotor controlled by a manually operable stepping mechanism. Thus, the manual actuation of the shifting mechanism to be performed by the operator of the vehicle is substantially simplified and accelerated, thus affording a further advantage over conventional arrangements, particularly when utilized in conjunction with a transmission intended for use in a sports vehicle.

The arrangement contemplated by the present invention is further advantageous, with respect to the conventional arrangements, when the shift plate is employed for effecting the shifting of a conventional transmission combined with a differential gear; in this case, the device employed for moving the shift plate is preferably disposed primarily within the differential gear housing.

BRIEF DESCRIPTION OF THE DRAWINGS

The aforementioned objectives, features and advantages of the present invention will become more readily apparent from a consideration of the detailed description hereinbelow, when considered in conjunction with the accompanying drawings, wherein:

FIG. 2 represents a lateral view, partially in section, of a vehicle transmission, combined with a differential gear, incorporating the shifting mechanism contemplated by the present invention;

FIG. 3 represents a section along line III—III of FIG. 2, on an enlarged scale; and FIG. 4 is a partial, cross-sectional view showing the connection of the clutches with their respective drive shafts in accordance with the present invention.

DETAILED DESCRIPTION OF THE DRAWINGS

Figure 1:
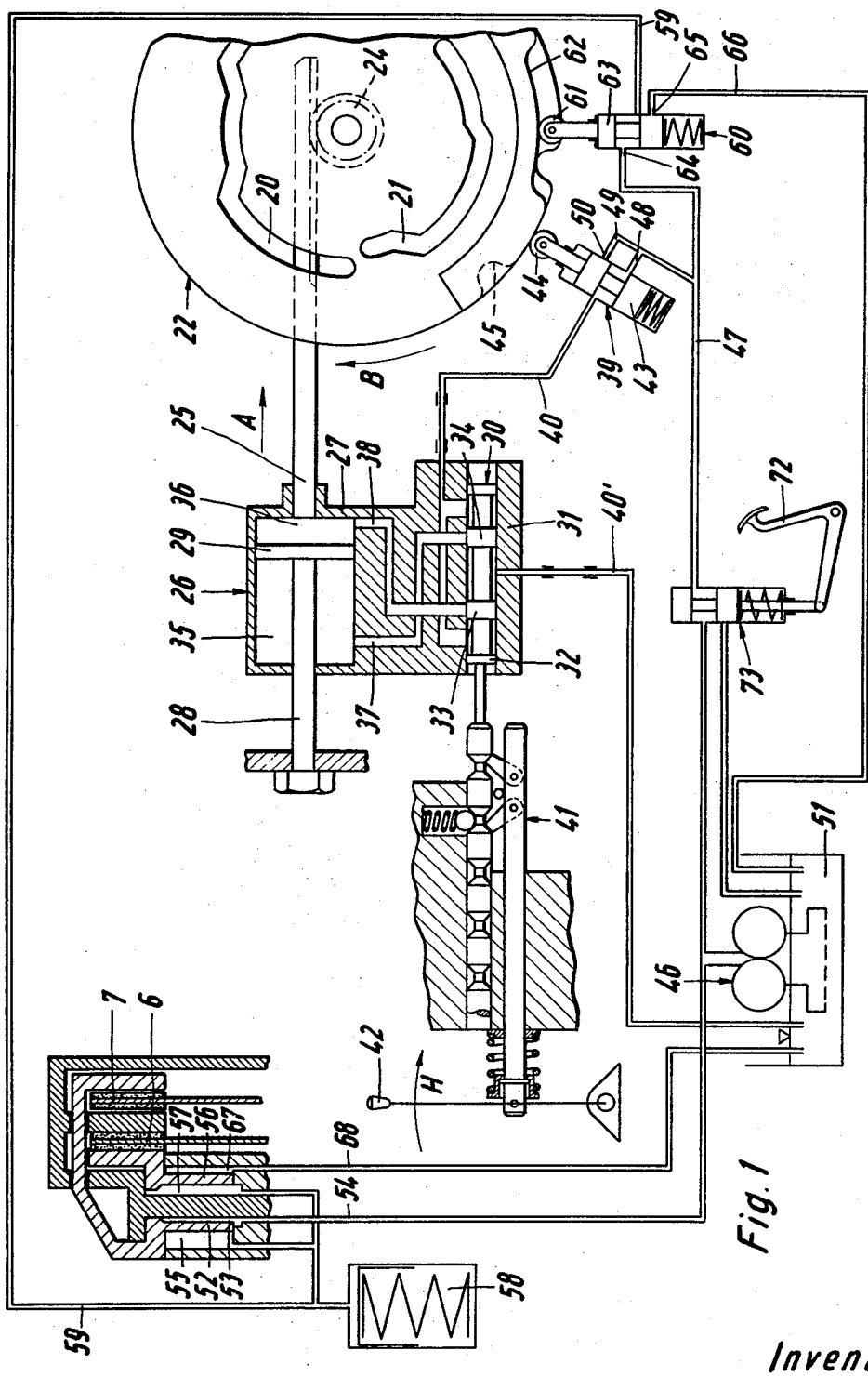
FIG. 1 represents a schematic view of the shifting mechanism for a vehicle transmission, in accordance with one embodiment of the present invention.

As seen most clearly in FIG. 2, the transmission 1 essentially comprises a transmission case 2, wherein a plurality of gear sets 3 are accommodated. The gear sets 3 are connected, on the input side, by means of a drive shaft 4 or a hollow shaft 5, respectively, to one of two clutches 6 and 7, combined in the manner of a twin clutch. For example, hollow shaft 5 is connected with clutch 6 and drives the gear sets for the first and third speeds. The drive shaft 4 would then drive the gear sets for the second and fourth speeds by means of clutch 7. The clutches 6 and 7, in turn, are connected with a crankshaft 8 of an internal combustion engine (not shown). Between the clutches 6 and 7 and the gear sets 3, a differential gear 11 is provided, acting on the vehicle wheels through drive shafts 9, 10 and connected with the gears 3 by means of a pinion 10'. The differential gear 11 is disposed within a housing 12 attached by flanges to the transmission case 2. The housing 12 simultaneously forms a housing or shell 13 enclosing the clutches 6 and 7.

In order to effect a shifting of gears 3, two shift rods 14 and 15 are displaceably mounted within the transmission case 2. Shift dogs 16 and 17, respectively, are affixed to shift rods 14 and 15, which shift dogs cooperate with respective gear units 3. The shift rods 14 and 15 are provided, respectively, with shift fingers 18 and 19 for effecting displacement thereof. The shift fingers 18, 19 engage within gates or slots 20 and 21, respectively, of a shift plate 22.

The shift plate 22 is rotatably mounted upon a support base 23 attached to the housing 12 of the differential gear 11 and extending into the interior of the transmission case 2. The shift plate 22 is driven by means of a pinion 24 connected therewith, a toothed rack 25 of a servomotor 26 cooperating with pinion 24.

As can be seen clearly in FIG. 1, the servomotor 26 consists essentially of a cylinder 27 connected with the rack 25, a piston 29 held stationary by means of a piston rod 28 accommodated within cylinder 27, and a control valve 30. The control valve 30 includes a housing 31 combined with the cylinder 27, and a slide 32 disposed within the housing 31. The slide 32 is provided with control pistons 33 and 34, which serve to control the lines 37 and 38, respectively, associated with the individual chambers 35 and 36, respectively, of the cylinder 27. At the same time, the control pistons 33 and 34 function to control a line 40 connected to a shifting phase valve 39 and a breather line 40'.

The slide 32 is connected, by means of a stepping mechanism 41 of conventional construction, with a manual shift lever 42. The shifting phase valve 39, connected with the slide 32 via line 40, includes a control piston 43 regulated by means of a roller 44 selectively engaging the profiled shifting control surfaces 45 provided at the circumferential surface of the shift plate 22. The shifting phase valve 39 controls the connection of line 40 with two lines, 48 and 49, supplied with a pressure medium from a pump 46 by way of a pressure line 47. In this connection, it should be noted that the line 49 includes a throttle 50 therein.

The pump 46 additionally supplies pressure medium to the hydraulically actuated clutches 6 and 7 from a pressure medium tank 51. For this purpose, an annular chamber 53, associated with an operating piston 52 of the clutch 7, is constantly under the influence of pressure medium by way of a line 54 connected with the pressure line 47. The annular chamber 55, opposite the annular chamber 53, and an operating piston 56 of the clutch 6, associated therewith, are connected with a clutch valve 60 via a line 59 provided with a pressure reservoir 58. The clutch valve 60 includes a regulating piston 63 controlled by means of a roller 61 selectively engaging profiled control surfaces 62 disposed in the region of the outer circumferential surface of shift plate 22. The regulating piston 63, depending upon its position, either establishes communication between line 59 and pump line 47 by way of throttle 64, or between line 59 and breather line 66 by way of throttle 65. An annular chamber 67 opposite the annular chamber 57 of the working piston 56 is provided with a breather line 68, like line 66 terminating in pressure medium tank 51.

The clutch valve 60 and the shifting phase valve 39 are preferably combined into a single structural unit and accommodated within a housing 69 (see FIG. 3). The housing 69 is inserted in an opening 70 of the transmission case 2 and is supported at the case 2 by means of a flange 71 and any conventional fastening means.

An overload valve 73, operable by means of a foot pedal 72, is additionally provided within the pump or pressure line 47.

In FIGS. 1 and 2, the shifting mechanism constructed in accordance with the present invention is illustrated with the first gear of the transmission engaged, wherein clutch 6 is engaged and clutch 7 is disengaged. The engagement of clutch 6 is effected by supplying pressure medium through lines 47, 59 into the annular chamber 57. Thus, the working piston 56 is moved to the right, as viewed in FIG. 1, so that the clutch 6 is connected with the shaft housing rotating at engine speed. Through lines 47, 59, pressure medium is simultaneously supplied to the annular chamber 55 behind the operating piston 52 of the clutch 7. In front of the operating piston 52, i.e. in annular chamber 53, pressure medium is supplied simultaneously through line 54 directly from pump 46. As a result, equal pressure exists both in front and behind operating piston 52 so that clutch 7 is disengaged by means of, for example, conventional compression springs (not shown) in the chamber 55. Shifting, for example, from the first into the second gear position, can be accomplished simply by pivoting the manual shift lever 42 in the direction of the arrow H. In this manner, the slide 32 of the control valve 30 is displaced in the direction of arrow A by way of the stepping mechanism 41. This motion serves to supply pressure medium from the pressure line 47 through line 48, shifting phase valve 39, line 40, and line 38, into chamber 36. The supply of pressure medium to chamber 36 results in a rapid movement of cylinder 27 and a corresponding movement of shift plate 22 in the circumferential direction indicated by arrow B. In this manner, the jaw clutch 17' rotating with the shaft 10' is connected with the second gear and thus simultaneously with the clutch 7 associated therewith (clutch 7 being disengaged heretofore). The last-mentioned connection is effected by means of the shifting gate or slot 21, the shift finger 19 and the shift fork 17.

After the connection of the second gear with the clutch 7 has been effected, the operating piston 43 of the shifting phase valve 39 is displaced by the profiled control surfaces 45 such that the line 48 is obstructed and the line 40, which supplied the control valve 30 (and, accordingly, the servomotor 26), is placed in communication with the pressure line 47 by way of the line 49. Due to the throttle 50 disposed within line 49, the movement of the cylinder 27 is immediately decelerated and, accordingly, the shift plate 22 is correspondingly decelerated.

Simultaneously with the displacement of the operating piston 43 of the shifting phase valve 39, clutch valve 60 is actuated by the profiled control surface 62 such that the clutch valve 60 severs the connection between line 59 and pressure line 47 and, instead, establishes communication between line 59 and breather line 66. Consequently, the pressure in the annular chambers 55 and 57 of clutches 6 and 7, respectively, drops and the clutch 6, associated with the first gear, is disengaged and clutch 7, associated with the second gear, is engaged.

By means of the shift plate 22, which continues its rotation at a slow speed, the operating piston 43 of the shifting phase valve 39 is again returned into the illustrated starting position by engagement with the profiled control surface 45. Thus, communication is again established between lines 40 and 47 by way of line 48, and, accordingly, the rotation of shift plate 22 is again accelerated. At this phase of rotation of the shift plate 22, the jaw clutch 16' of the first gear is disengaged by means of the shifting gate or slot 20.

After the shifting operation has been accomplished, the cylinder 27 is again in the illustrated starting position with respect to the slide 32, whereby the supply of pressure medium is interrupted and the shift plate is, accordingly, arrested in its rotation.

Reverse shifting of the gears is effected analagously to the process described above, with the primary difference being that the manual shift lever 42 is pivoted in the direction opposite to that of arrow H. This motion of the manual shift lever effects a movement of the slide 32 and, consequently, of the cylinder 27 in a direction opposite to that of arrow A and imparts a rotation to the shift plate in a circumferential direction opposite to that of arrow B.

By depressing foot pedal 72 and actuating overload valve 73 disposed within pressure line 47, it is possible to effect pressure regulation for starting the vehicle in the first and in the reverse gear positions.

It should be apparent that the scope of the present invention is not restricted to the structural details of the single embodiment illustrated merely as an example. Thus, it is certainly within the contemplation of the present invention to provide a control device dependent upon the rotational speed of the vehicle engine for controlling the slide 32 instead of the manually actuated stepping mechanism illustrated in the drawings. It is to be clearly understood that the scope of the present invention is susceptible of numerous changes and modifications as would be apparent to one with normal skill in the pertinent technology.

What is claimed is:

1. A shifting mechanism for a multi-speed power transmission, comprising rotatably supported disk-shaped shift plate means having shifting slot means provided therein and profiled control surface means, source means for supplying a pressure medium, shifting phase valve means operatively connected with said pressure source means and adapted for selective engagement with said profiled control surface means of said shift plate means for controlling the rotational speed of said shift plate means, clutch valve means operatively connected with said pressure source means and adapted for selective engagement with said profile control surfaces of said shift plate means and operatively connected with clutch means for controlling selective engagement and disengagement thereof, and control means, including manually operated means and servo-motor means operatively connected with said manually operated means for effecting rotation of said shift plate means, for controlling the shifting between individual gears within the transmission, wherein said shifting phase valve means is also operatively connected with said control means.

2. A shifting mechanism according to claim 1, further comprising transmission housing means having at least one opening therein, said shift plate means being disposed within said transmission housing means.

3. A shifting mechanism according to claim 2, wherein said shifting phase valve means and said clutch valve means are combined within a common structural unit which is supported at an opening of said transmission housing means.

4. A shifting mechanism according to claim 2, wherein said control means includes stepping means operatively interposed between said manually operated means and said servo-motor means.

5. A shifting mechanism according to claim 2, wherein said transmission is operatively combined with a vehicle differential gear means and a housing therefor, said means for effecting rotation of said shift plate means being disposed primarily within said differential gear housing.

6. A shifting mechanism according to claim 4, wherein said transmission is operatively combined with a vehicle differential gear means and a housing therefor, said means for effecting rotation of said shift plate means being disposed primarily within said differential gear housing.

7. A shifting mechanism according to claim 6, wherein said clutch means includes two clutches combined in the form of a twin clutch.

8. A shifting mechanism according to claim 7, wherein said servo-motor means includes a cylinder and a slide member supported for motion therein, said slide member including control pistons for selectively controlling flow of hydraulic medium to said shifting phase valve means.

9. A shifting mechanism according to claim 8, wherein said shifting phase valve means includes an operating piston and a piston rod operatively connecting said profiled control surfaces of said shift plate means and said operating piston.

10. A shifting mechanism according to claim 9, wherein said clutch valve means includes an operating piston and a piston rod operatively connecting said operating piston and said profiled control surfaces of said shift plate means.

* * * * *